United States Patent Office 2,901,390
Patented Aug. 25, 1959

2,901,390

INORGANIC PAPERS AND METHODS OF MAKING SAME

Joseph E. Conklin, New York, and Robert J. Holmes, Huntington, N.Y., assignors to General Aniline & Film Corporation, New York, N.Y., a corporation of Delaware No Drawing. Application December 19, 1955
Serial No. 553,696

14 Claims. (Cl. 162—152)

This invention relates to new, useful and improved processes for the preparation of paper and paper-like products, particularly in sheet form, from mineral substances and the products resulting therefrom.

Papers and the like prepared from mineral or inorganic substances have been developed as specialty papers for use in numerous fields of application where the common cellulosic base type paper was found to be sadly deficient in many desired properties. In its electronics applications, paper finds extensive use in capacitors as a dielectric material. However, the dielectric properties of paper are greatly inferior to those of mica and the various ceramics used for such purposes. In addition, at elevated temperatures the cellulosic papers are practically worthless due to the degeneration of the organic cellulosic matter. On the other hand, dielectric materials prepared from the inorganic base substances such as glass, ceramics, mica and the like do not suffer from such deficiencies as described above for the cellulosic papers. However, in contradistinction to the advantages of such inorganic materials for the above enumerated properties, these inorganic dielectric substances have certain inherent properties which normally render them undesirable in many instances. Thus the inorganic dielectrics have not found extensive or, indeed, practical application in the electronics field and other allied fields where flexibility and strength are necessary and/or desirable characteristics of the dielectric product, and this is especially so where the product must be of "paper" thinness, that is, normally less than about 0.01 inch in thickness. Heretofore attempts to prepare such products employing organic binders and in particular resins such as are used in conventional paper making processes did not produce a satisfactory product. First, it was found that in view of the difficulty in coating wet inorganic fibers, excessive amounts of such resins are required. This difficulty in coating the mineral fibers manifested itself in the formation of resin clots rather than in a desired and necessary uniform distribution of the resin. Secondly, finished sheets prepared from such earlier procedures did not have the qualities of the fibers and did not therefore resemble a "paper" product but rather resulted in a plastic product reinforced with an inorganic filler, and this because of the high ratio of resin to fibers required. Other attempts to overcome these difficulties wherein on the one hand the fibers are precoated and on the other hand organic solvents are employed in lieu of water as the liquid dispersing medium for the fibers did not prove successful. The products resulting from these manipulations resembled loosely carded webs and were not possessed of the characteristics of a paper sheet. Still another problem arising from the attempts to use the conventional resins developed for use with cellulose pulps is that many of such resins were developed for use at pH values of from about 6 to 8 and these resins were found to be completely inoperative at the pH values (pH about 3 to 4) normally employed in the making of inorganic papers.

It is an object of this invention to provide a process for the preparation of paper and/or paper-like products from inorganic materials.

It is a further object of this invention to provide a process whereby sheet-like materials may be prepared from mineral fibers and the like.

It is a still further object of this invention to provide strong and flexible sheet-like materials derived from inorganic base substances.

It is another object of this invention to provide processes for the manufacture of inorganic papers employing a polyvinyl pyrrolidone-containing polymeric material.

It is another object of this invention to provide inorganic papers containing a polyvinyl pyrrolidone-containing polymeric material.

Other objects will appear hereinafter as the description proceeds.

It was unexpectedly discovered that in the preparation of paper and other sheet-like materials having as a major basis therefor inorganic fibers or flakes, the incorporation during the paper-making process of minor amounts of a polyvinyl pyrrolidone-containing polymeric material in the paper-making composition produced a product having all of the advantages ascribable to the inorganic constituents of the paper but still nevertheless possessed of the important characteristics of strength and flexibility not heretofore obtainable in such types of paper.

The general procedure for manufacturing the papers of this invention involves techniques similar to those heretofore employed in the paper-making art with the outstanding difference being the addition to the inorganic paper-making stock at some period in the paper-making process, between beating and deposition on the wire, of a polyvinyl pyrrolidone-containing polymeric material. More particularly, the general process involves dispersing the inorganic material in a relatively large volume of water and agitating the mixture vigorously. To the suspension is then added the polyvinyl pyrrolidone-containing polymeric material, and then after additional mixing, it is preferable that a means for insolubilizing the polyvinyl pyrrolidone-containing polymeric material on to the mineral base be employed. The stock is again additionally agitated and the resultant slurry is then processed in the normal manner to form a paper-like sheet.

The polyvinyl pyrrolidone-containing polymeric materials which may be used in the present invention include all of the polyvinyl pyrrolidone-containing water-soluble polymers and copolymers containing a minimum of 20% vinyl pyrrolidone. Among these polymers are the following:

Polyvinyl pyrrolidone (N-vinyl-2-pyrrolidone)
Copolymers of vinyl pyrrolidone and the following compounds:
 Allyl alcohol
 Diallyl phthalate
 Isobutyl vinyl ether
 Maleic anhydride
 Vinyl acetate
 Vinyl chloride
 Acrylic acid
 Vinyl laurate
 Vinyl stearate, and the like The amount of the vinyl pyrrolidone in the copolymers useful in this invention may vary considerably depending on the chemical nature of the compound copolymerizable therewith. The following table gives the maximum limit of such compounds in the operable copolymers.

|                      | Percent |
|----------------------|---------|
| Allyl alcohol        | 50      |
| Diallyl phthalate    | 20      |
| Isobutyl vinyl ether | 20      |
| Ethyl vinyl ether    | 50      |
| Methyl vinyl ether   | 80      |
| Maleic anhydride     | 80      |
| Vinyl acetate        | 40      |
| Vinyl chloride       | 35      |
| Acrylic acid         | 75      |
| Vinyl laurate        | 20      |
| Vinyl stearate       | 15      |

The molecular weights of the polymers and copolymers may range from about 300 to 70,000 or more. Viscosity measurements are commonly used as an indication of the average molecular weight of the polymeric composition. The K value (Fikentscher) of any particular mixture of polymers is calculated from viscosity data and is useful as an indication of the average molecular weight of such mixture. The determination of the K value is fully described in "Modern Plastics," vol. 23, No. 3, pp. 157–61, 212, 214, 216 and 218 (1945), and is defined as 1000 times K in the empirical relative viscosity equation:

$$\frac{\log_{10} \eta \text{ rel.}}{C} = \frac{75k^2}{1+1.5kC} + k$$

wherein C is the concentration in grams per 100 cc. polymer solution and $\eta$ rel. is the ratio of viscosity of solution to that of pure solvent. The K values are reported as 1000 times the calculated viscosity coefficient in order to avoid the use of decimals. For the purpose of the present invention, there may be employed those polymeric substances having a K value of about 10 to 200, and preferably from about 15 to 100.

K values and specific viscosities ($\eta$ sp.) are interconvertible and are related through relative viscosity ($\eta$ rel.). Thus, when viscosity measurements are taken on solutions which have a concentration of 1.00 g. polymer per deciliter of solution at 25° C. (C=1), the relations are as follows:

(1) $\eta$ rel. = $\eta$ sp. + 1
(2) Relative viscosity = specific viscosity + 1
(3) Relative viscosity = $10[0.001K + 0.000075K^2/(1+0.0015K)]$
(4) $\eta$ sp. = $-1 + 10[0.001K + 0.000075K^2/(1+0.0015K)]$ Relative viscosity, specific viscosity, and K are dimensionless, whereas inherent viscosity ($\log_e \eta$ rel. $\div$ C) and intrinsic viscosity (the limit of inherent viscosity as C approaches 0) have the dimensions of dilution, that is, the reciprocal of concentration. Intrinsic viscosity and K are intended to be independent of concentration.

Among the means which may be employed to effect the insolubilization of the polyvinyl pyrrolidone-containing polymeric substances on the inorganic fiber or flake are the following.

I. Chemical means:
(a) Polybasic acids—
   Tannic acid
   Maleic acid
   Malonic acid
   Adipic acid
   Succinic acid
   Phthalic acid
(b) Phenols—
   Resorcinol
   Alkylated phenols e.g., nonyl phenol
(c) Persulfates—
   Ammonium persulfate
   Sodium persulfate
   Potassium persulfate
(d) Polymeric compounds containing carboxyl or anhydride groups, e.g., copolymers of vinyl methyl ether and maleic anhydride, vinyl ethyl ether and maleic anhydride, styrene and maleic anhydride, and the like.
(e) Isocyanates, e.g.—
   Tolidine diisocyanate
   2,4-tolylene diisocyanate
   1,5-naphthalene diisocyanate
   4,4'-diphenyl diisocyanate
   1,4-xylylene diisocyanate II. Other means include the use of elevated temperatures to effect the desired insolubilization of the polyvinyl pyrrolidone-containing substances on the inorganic stock. While the use of heat to effect the insolubilization of the polyvinyl pyrrolidone-containing compounds may be resorted to, as mentioned above, at various stages of the paper-making process it is most expedient to employ this technique during the drying of the paper-like web on the "cans." At 300° F. substantially complete insolubilization of the polymeric substances is obtained in a few minutes. Higher temperatures may be employed to effect a faster insolubilization. Thus at about 500° F. this process takes about 10 seconds. As described above, it is preferred to insolubilize the polyvinyl pyrrolidone-containing substances on the inorganic stock since this renders the resultant "paper" product very resistant to moisture (either as vapor or water) and its obvious deleterious effects. It is to be noted, however, that to achieve the benefits of this invention such insolubilization is not absolutely essential because the polymeric compounds employed herein are so highly substantive to the inorganic stock (i.e., glass flakes, fibers, asbestos, mica, etc.) that substantially all of the polymer added as an aqueous solution is exhausted from the water solution onto the fiber in much the same manner one encounters in the dyeing art, so that in the final product, whether insolubilization is resorted to or not, there is present about the same polymer content.

The inorganic materials which are contemplated and operable in the present invention include both natural and synthetic inorganic substances such as glass fibers, silica fibers, ceramic fibers, asbestos fibers, and flake materials such as ceramic flakes, glass flakes, mica and the like and mixtures of these with cellulosic fibers normally employed in paper-making. The amount of polyvinyl pyrrolidone-containing polymeric material which may be employed in the process and products of this invention is not critical. As little as 0.1% based on the weight of the inorganic stock gives outstanding results. The preferred range based on the weight of the inorganic stock is from about 0.2% to about 5%. Larger amounts may be used if desired but are not necessary in order to achieve the advantages of this invention. The amount of chemical insolubilizing agent employed should be sufficient to effect the insolubilization of the desired amount of the polyvinyl pyrrolidone-containing polymeric material. The following examples will serve to illustrate this invention without being deemed limitative thereof.

EXAMPLE 1

0.5 g. of a glass fiber is added to 250 ml. of water (pH 3) and vigorously agitated for about 20 seconds. The physical and chemical characteristics of the glass fiber are as follows:

Chemical composition:

| $SiO_2$ | 54% |
|---|---|
| CaO | 16% |
| $Al_2O_3$ and $Fe_2O_3$ | 15% |
| $B_2O_3$ | 10% |
| $Na_2O$ and $K_2O$ | 5% |

Physical characteristics:

| Fiber length | 1/128" to 1/16". |
|---|---|
| Fiber diameter | 0.50μ. |
| Fiber appearance | White, soft fibers. |

To this dispersion there is added dropwise from a 10% aqueous solution 10 drops of polyvinyl pyrrolidone (K=47) and the mixing is continued for about 30 seconds. There is then added to that resultant dispersion 10 drops of a 5% aqueous solution of a copolymer of vinyl methyl ether and maleic anhydride (K=50), the mass is again agitated for about 10 seconds after which the slurry is poured into a standard sheet mold and the wet web couched from a 200-mesh screen. The properties of the resultant paper are as follows:

| | |
|---|---|
| Percent polyvinyl pyrrolidone and copolymer of vinyl methyl ether and maleic anhydride percent | 0.6 |
| Sheet thickness in | 0.002 |
| Breaking strength lb./in. | 2.5 |
| Tensile strength p.s.i. | 1200 |
| Density g./cc. | 0.305 |

EXAMPLE 2

The procedure of Example 1 is repeated except that no organic material is added to the inorganic stock, that is, the polyvinyl pyrrolidone, and its chemical insolubilizer is omitted. The properties of such a sheet are given in Table I with a comparison with the product of Example 1.

Table I

| | Total Polymer Content, Percent | Sheet Thickness | Breaking Strength (lb./in.) | Tensile Strength (p.s.i.) | Density (g./cc.) |
|---|---|---|---|---|---|
| Example 1 | 0.7 | 0.003 | 3.0 | 1000 | 0.197 |
| Example 2 | 0.0 | 0.011 | 0.04 | 40 | 0.205 |

EXAMPLE 3

The procedure of Example 1 is repeated using 0.5 g. of a silica fiber, the chemical composition of which is:

| | Percent |
|---|---|
| $SiO_2$ | 97 |
| $Al_2O_3$ and $Fe_2O_3$ | 3 |

The physical characteristics are:

| | |
|---|---|
| Fiber length | 1/28 in. |
| Fiber diameter | 0.50μ. |
| Fiber appearance | White, soft fibers. |

EXAMPLE 4

The procedure of Example 3 is repeated except that the chemical insolubilizer is omitted. Table II gives the properties of the sheets of Examples 3 and 4.

Table II

| | Total Polymer Content, Percent | Sheet Thickness | Breaking Strength (lb./in.) | Tensile Strength (p.s.i.) | Density (g./cc.) |
|---|---|---|---|---|---|
| Example 3 | 0.6 | 0.006 | 1.0 | 160 | 0.224 |
| Example 4 | 0.4 | 0.006 | 0.5 | 80 | 0.220 |

EXAMPLE 5

1.0 gram of a glass fiber is added to 400 ml. of water at a pH of 4.5 and vigorously agitated for about ½ minute. The glass fiber has the same chemical composition as that of Example 1. The physical characteristics are:

| | |
|---|---|
| Fiber length | 1/16 to 1/8 in. |
| Fiber diameter | 1.25μ. |
| Fiber appearance | White, coarse fibers. |

To the above dispersion there is added slowly from a 5% aqueous solution 1 ml. of polyvinyl pyrrolidone (K=25) and the mixing is continued for about 1 minute. There is then added ½ ml. of a 10% aqueous solution of a copolymer of vinyl ethyl ether and maleic anhydride (K=40), and the mass is further agitated for about 20 seconds, after which it is formed into a sheet as described in Example 1. The properties of the resultant web are given in Table III.

Table III

| Example | Total Polymer Content, Percent | Sheet Thickness | Breaking Strength (lb./in.) | Tensile Strength (p.s.i.) | Density (g./cc.) |
|---|---|---|---|---|---|
| 5 | 0.6 | 0.002 | 2.5 | 1,200 | 0.305 |
| 6 | 0.6 | 0.004 | 1.25 | 300 | 0.157 |
| 7 | 0.4 | 0.004 | 0.60 | 150 | 0.155 |
| 8 | 0.7 | 0.007 | 1.25 | 180 | 0.253 |
| 9 | 0.5 | 0.007 | 0.50 | 100 | 0.250 |
| 10 | 0.26 | 0.005 | 1.75 | 350 | 0.288 |

EXAMPLE 6

The procedure of Example 1 is repeated employing a ceramic fiber (designated as Fiber "F"). The results are given in Table III above. The physical and chemical characteristics of the fiber are given in Table IV.

Table IV

| | Length, inches | Diameter, μ | Appearance |
|---|---|---|---|
| Fiber F | 1/28 to 1/16 | 4 to 10 | white, coarse fibers. |
| Fiber T | 1/28 | 4 to 10 | gray, coarse fibers. |
| Asbestos | 1/8 to 1/2 | 0.05 | blue, soft fibers. |

EXAMPLE 7

The procedure of Example 6 is repeated but omitting the chemical insolubilizer (as in Example 4). The properties of the web are set forth in Table III.

EXAMPLE 8

The procedure of Example 6 is repeated employing a ceramic fiber differing from that of Example 6. The characteristics of this fiber, designated Fiber "T," are given in Table IV. The properties of the resultant web are set forth in Table III.

EXAMPLE 9

The procedure of Example 8 is repeated except that the chemical insolubilizer is omitted (as in Example 4). The properties of the paper sheet are given in Table III.

EXAMPLE 10

The procedure of Example 1 is repeated using asbestos fibers in lieu of glass fibers. The fiber characteristics are given in Table IV, and the properties of the asbestos sheet product set forth in Table III.

In the following Examples 11–14 webs are prepared as in Example 2 (i.e., no polymeric material added to the inorganic stock), employing the fibers described in Examples 3, 5, 6 and 8, respectively, and the properties of the resultant webs are given in Table V below.

Table V

| Example | Thickness (in.) | Breaking Strength (lb./in.) | Tensile Strength (p.s.i.) | Density (g./cc.) |
|---|---|---|---|---|
| 11 | 0.009 | 0.1 | 12 | 0.201 |
| 12 | 0.025 | 0.0001 | 0.01 | 0.205 |
| 13 | 0.024 | 0.4 | 22 | 0.206 |
| 14 | 0.060 | 0.6 | 10 | 0.150 |

From a comparison of the data in Table V and that given above for the sheets prepared in accordance with this invention, it is evident that surprising and outstanding results are achieved in accordance with the processes of this invention. Not only are the varous properties and in particular, breaking and tensile strength, vastly improved but it is now possible to prepare sheets having such outstanding characteristics in relatively thin sheets. Thus, without any polymer content no sheets could be prepared less than 0.009 inch thick whereas with the polymers described herein useful sheets with thickness ranging from 0.002 to 0.007 inch are possible. In the following examples there are described sheets prepared from inorganic flake materials. While sheets from mica may be prepared without the polymers herein contemplated, it is necessary in such process to employ specialized exfoliating equipment or a combination of chemical treatment and roasting. The products resulting from these techniques, again, are highly inferior to those produced in accordance with this invention as will be evident below.

EXAMPLE 15

3 g. of mica flakes of miscellaneous lengths and having an average thickness of $2\mu$ and whose chemical composition is:

|  | Percent |
|---|---|
| $SiO_2$ | 43 |
| $Al_2O_3.Fe_2O_3$ | 40 |
| $Na_2O.K_2O$ | 12 |
| $H_2O$ | 5 | are dispersed in 350 ml. of water (pH=4) by means of vigorous agitation in a Waring Blender for 30 seconds. To this dispersion there is added slowly with agitation 2 ml. of a 10% aqueous solution of polyvinyl pyrrolidone (K=75). Mixing is continued for 20 seconds. Agitation is continued and there is then added over a period of 20 seconds 2.5 ml. of a 10% aqueous solution of a copolymer of vinyl ethyl ether and maleic anhydride (K=25). After ½ minute of additional mixing, the slurry is formed into a sheet as described in Example 1. The properties of the resultant sheet are given in Table VI.

*Table VI*

| Example | Total Polymer Content | Sheet Thickness (in.) | Breaking Strength (lb./in.) | Tensile Strength (p.s.i.) | Density (g./cc.) |
|---|---|---|---|---|---|
| 15 | 2.6 | 0.009 | 1.5 | 160 | 0.55 |
| 17 | 0.2 | 0.002 | 0.37 | 185 | 0.79 |

EXAMPLE 16

The procedure of Example 15 is repeated except that the polymers are omitted (as in Example 2). No sheet product can be prepared.

EXAMPLE 17

The procedure of Example 15 is repeated employing glass flakes in lieu of the mica. The chemical composition is similar to that of the glass fibers described in Example 1. The flakes are on the average $16\mu$ thick, ¼ in. in area and are colorless and transparent. The properties of the resultant sheet are set forth in Table VI.

EXAMPLE 18

The procedure of Example 16 is repeated using the glass flakes of Example 17 in lieu of mica. No useable sheet product is obtainable.

In the following Examples 19–26 set forth in Table VII, copolymers containing vinyl pyrrolidone are used in place of the polyvinyl pyrrolidone in the process of Example 1. The resulting sheets are comparable to that of Example 1.

*Table VII*

| Example | Copolymer | Percent |
|---|---|---|
| 19 | vinyl pyrrolidone | 70 |
|  | allyl alcohol | 30 |
| 20 | vinyl pyrrolidone | 85 |
|  | diallyl phthalate | 15 |
| 21 | vinyl pyrrolidone | 60 |
|  | vinyl ethyl ether | 40 |
| 22 | vinyl pyrrolidone | 30 |
|  | vinyl methyl ether | 70 |
| 23 | vinyl pyrrolidone | 75 |
|  | vinyl acetate | 25 |
| 24 | vinyl pyrrolidone | 50 |
|  | acrylic acid | 50 |
| 25 | vinyl pyrrolidone | 20 |
|  | maleic anhydride | 80 |
| 26 | vinyl pyrrolidone | 94 |
|  | vinyl stearate | 6 |

EXAMPLE 27

The procedure of Example 3 is repeated using 10 drops of a 10% aqueous solution of maleic acid as the insolubilizer. The resultant sheet has properties similar to that of Example 3.

Example 28

The procedure of Example 19 is repeated using, however, 20 drops of a 5% aqueous solution of resorcinol as the chemical insolubilizer.

EXAMPLE 29

The procedure of Example 24 is repeated using 10 drops of a 10% aqueous solution of ammonium persulfate as the chemical insolubilizer.

EXAMPLE 30

The procedure of Example 25 is repeated using 1 ml. of a 5% aqueous solution of a styrene-maleic anhydride copolymer.

EXAMPLE 31

The procedure of Example 26 is repeated using 15 drops of a 10% solution of 2,4-tolylene diisocyanate in chlorobenzene as the chemical insolubilizer.

EXAMPLE 32

The procedure of Example 4 is repeated. After the web is couched from the 200-mesh screen it is dried and then heated to 300° F. for 3 minutes. The resultant sheet has properties comparable to those obtained in Example 3.

EXAMPLE 33

The procedure of Example 7 is repeated. After the web is removed from the screen it is dried and heated to 500° F. for 10 seconds. The resultant web has a breaking and tensile strength twice that of the web of Example 7.

EXAMPLE 34

The procedure of Example 9 is repeated. The web after couching is dried and heated to 400° F. for 30 seconds. The breaking strength is 1.00 lb./in. and the tensile strength 200 p.s.i.

EXAMPLE 35

0.5 g. of glass fibers employed in Example 1 and 0.5 g. of a cellulose pulp are added to 500 ml. of water (pH 7.5) and vigorously agitated for 40 seconds. To this dispersion there is added slowly 20 drops of a 10% aqueous polyvinyl pyrrolidone solution (K=35) with vigorous agitation for about 20 seconds. The mass is formed into a web as in Example 1. The wet web is removed from the screen, dried and then heated to 300° F. for 2 minutes. The resultant sheet, containing about equal parts of glass fiber and cellulose fiber, resembles a sheet of newsprint in its flexibility, hand, and strength.

EXAMPLE 36

1.0 g. of glass fibers similar to that of Example 5 and 0.5 g. of cellulose pulp are dispersed in 600 ml. of $H_2O$ (pH 6.5) with vigorous agitation. There is then slowly added, with agitation, 1.5 ml. of a 5% aqueous solution of a copolymer of vinyl methyl ether and maleic anhydride (K=50). A sheet is then formed as described in Example 1. The properties of the resultant sheet are similar to those of the sheet of Example 1.

In addition to the above enumerated compounds suitable for the purposes of this invention, that is, N-vinyl-2-pyrrolidone and copolymers thereof, one may employ the lower alkyl derivatives of N-vinyl-2-pyrrolidone and copolymers thereof. Such alkyl derivatives include 3-methyl-N-vinyl-2-pyrrolidone, 4-methyl-N-vinyl-2-pyrrolidone, 3,3-dimethyl-N-vinyl-2-pyrrolidone, 4-ethyl-N-vinyl-2-pyrrolidone, 5-methyl-N-vinyl-2-pyrrolidone, 5-ethyl-N-vinyl-2-pyrrolidone and the like. Suitable copolymers of these alkyl-N-vinyl-2-pyrrolidones include:

| | | |
|---|---|---|
| I. | 87% | 3-methyl-N-vinyl-2-pyrrolidone |
| | 13% | vinyl bromide |
| II. | 87% | 3-methyl-N-vinyl-2-pyrrolidone |
| | 13% | vinyl chloride |
| III. | 88% | 4-ethyl-N-vinyl-2-pyrrolidone |
| | 12% | vinyl chloride |
| IV. | 91% | 3,3-dimethyl-N-vinyl-2-pyrrolidone |
| | 9% | vinyl chloride |

Further, while this invention has been exemplified with siliceous fibers and flakes, other inorganic fibers and fine flake materials will be equally operable.

Variations and modifications which will be obvious to those skilled in the art may be made in the procedures above described without departing from the spirit and scope of the invention.

We claim:

1. A process for preparing a sheet-like product having as a major basis therefor inorganic siliceous stock material comprising incorporating in an aqueous dispersion of said stock from about 0.1% to about 5% of a water-soluble polymeric substance containing at least 20% N-vinyl-2-pyrrolidone and forming a sheet therefrom.

2. A process for preparing a sheet-like product from siliceous stock which comprises adding to an aqueous dispersion of said stock from about 0.2 to about 5% of a water-soluble polymer containing at least 20% N-vinyl-2-pyrrolidone based on the weight of the stock and forming a sheet from said stock.

3. The process of claim 2 wherein the stock comprises glass fibers.

4. The process of claim 2 wherein the stock comprises silica fibers.

5. The process of claim 2 wherein the stock comprises asbestos fibers.

6. The process of claim 2 wherein the stock comprises mica.

7. A process for preparing a sheet-like product from siliceous stock which comprises adding to an aqueous dispersion of said stock from about 0.1% to about 5% of a water soluble polymer containing at least 20% vinyl pyrrolidone, then adding a chemical insolubilizer for said polymeric substance and forming a sheet from said prepared stock.

8. A process for preparing a glass paper-like product which comprises adding to an aqueous dispersion of glass fibers from 0.2 to 5% of polyvinyl pyrrolidone based on the weight of the glass fibers and forming a sheet therefrom.

9. The process of claim 8 wherein the polyvinyl pyrrolidone is rendered water-insoluble.

10. The process of claim 9 wherein a copolymer of vinyl methyl ether and maleic anhydride is employed to effect insolubilization of the polyvinyl pyrrolidone.

11. The process of claim 9 wherein insolubilization of the polyvinyl pyrrolidone is effected by means of an elevated temperature.

12. An inorganic siliceous paper containing from about 0.1% to about 5% of a vinyl pyrrolidone-containing polymer.

13. A glass fiber paper containing from about 0.1% to about 5% of a polymeric substance having at least 20% N-vinyl-2-pyrrolidone contained therein.

14. A glass fiber paper-like product containing from about 0.2 to about 5% based on the weight of the glass fiber of an N-vinyl-2-pyrrolidone-containing polymer having at least 20% of said N-vinyl-2-pyrrolidone contained in the said polymer.

References Cited in the file of this patent

UNITED STATES PATENTS

| | | |
|---|---|---|
| 2,265,450 | Reppe | Dec. 9, 1941 |
| 2,563,289 | Steinman | Aug. 7, 1951 |
| 2,658,045 | Schildknecht | Nov. 3, 1953 |
| 2,667,473 | Mormer | Jan. 26, 1954 |
| 2,694,630 | Landes | Nov. 6, 1954 |
| 2,711,398 | Barnes | June 21, 1955 |
| 2,723,248 | Wright | Nov. 8, 1955 |

OTHER REFERENCES

Callinan: "The Electrical Properties of Glass-Fiber Papers," Naval Research Laboratory, Washington, D.C., May 1951, page 13.